Figure 1:
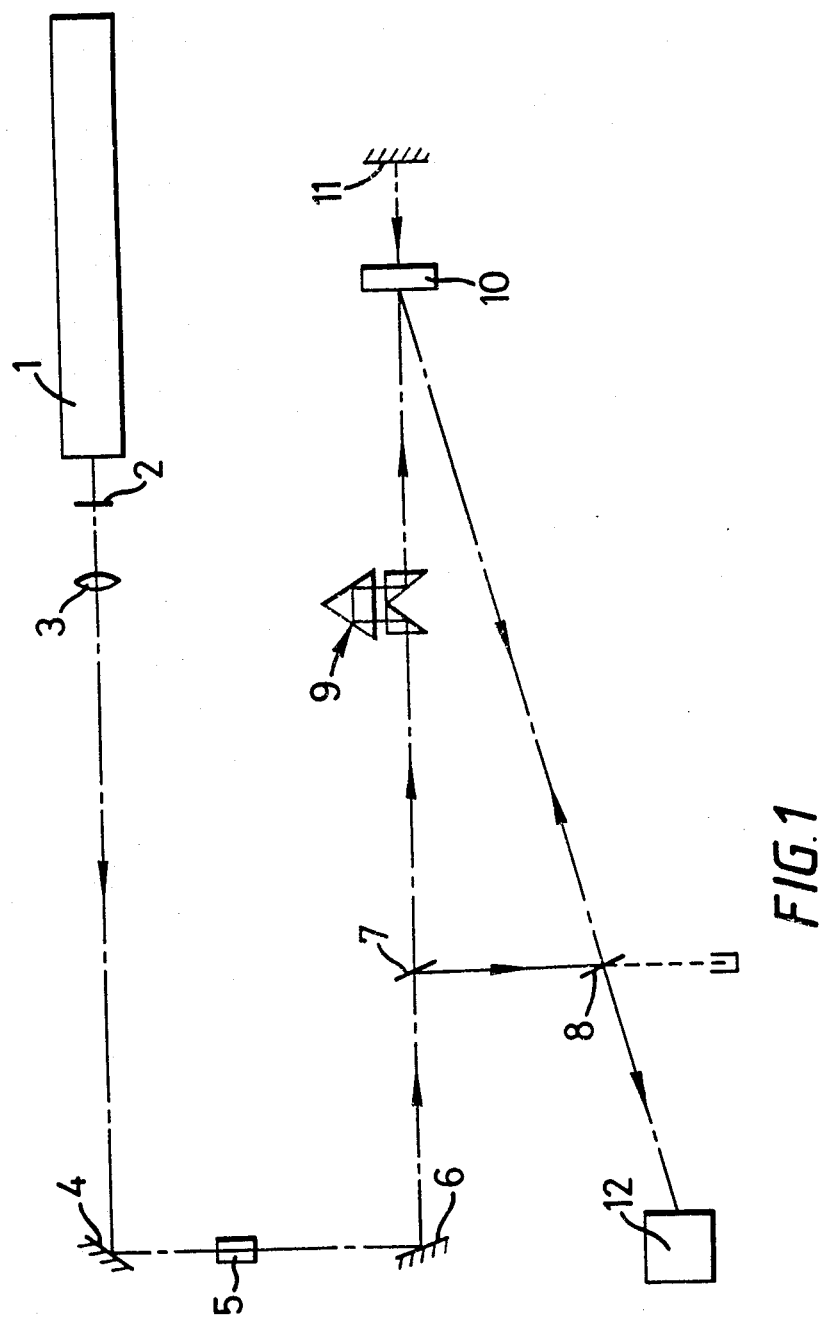

United States Patent [19]

Connors et al.

[11] Patent Number: 4,768,846
[45] Date of Patent: Sep. 6, 1988

[54] PHASE CONJUGATE REFLECTING MEDIA

[75] Inventors: Lucy M. Connors, Sunbury-on-Thames; Marion R. Drury, Teddinton, both of England

[73] Assignee: The British Petroleum Co. plc, London, England

[21] Appl. No.: 38,243

[22] Filed: Apr. 14, 1987

[30] Foreign Application Priority Data

Apr. 24, 1986 [GB] United Kingdom ............. 8610027

[51] Int. Cl.$^4$ ................. G03H 1/04; G02F 1/35
[52] U.S. Cl. ................................ 350/1.1; 350/364; 350/354; 372/99
[58] Field of Search ............... 350/3.61, 3.63, 3.64, 350/354, 1.1; 372/99

[56] References Cited

U.S. PATENT DOCUMENTS

| 3,782,802 | 1/1974 | Micheron et al. | 350/3.64 |
| 3,892,465 | 7/1975 | Micheron et al. | 350/3.64 |
| 4,063,795 | 12/1977 | Huignard et al. | 350/3.64 |
| 4,233,571 | 11/1980 | Wang et al. | 372/99 |
| 4,496,222 | 1/1985 | Shah | 350/354 |
| 4,505,536 | 3/1985 | Huignard et al. | 350/3.64 |
| 4,515,429 | 5/1985 | Smith et al. | 350/354 |
| 4,529,273 | 7/1985 | Cronin Golumb et al. | 350/354 |
| 4,571,954 | 2/1986 | Roberts et al. | 350/354 |

FOREIGN PATENT DOCUMENTS

| 0081477 | 6/1983 | European Pat. Off. |
| 0124979 | 11/1984 | European Pat. Off. |
| 0152187 | 8/1985 | European Pat. Off. |
| 1525738 | 5/1968 | France |

OTHER PUBLICATIONS

Eichler et al., "Laser-Induced Dynamic Gratings," Springer Series in Optical Sciences, vol. 50, Berlin, 1986, pp. 10–12, 114–119, 159–167, 181–190.
Kaner et al., "Plastics that Conduct Electricity," Scientific American, Feb., 1988, pp. 106–111.

Primary Examiner—Bruce Y. Arnold
Assistant Examiner—Martin Lerner
Attorney, Agent, or Firm—Brooks Haidt Haffner & Delahunty

[57] ABSTRACT

This invention relates to the use of films of poly(acetylene) whether isotropic, of low crystallinity or oriented as a nonlinear phase conjugate reflecting medium. The principle can be applied to devices comprising phase conjugate mirrors, or use of such devices for degenerate four-wave mixing or for producing real time holograms. The resultant devices can be used in laser targetting, high speed image processing, optical communication and for power and image transmission.

10 Claims, 3 Drawing Sheets

PHASE CONJUGATE REFLECTING MEDIA

The present invention relates to novel phase conjugate reflecting media and the use thereof for nonlinear optical phase conjugation.

Optical phase conjugation is a technique which uses the nonlinear optical properties of a material to produce an output beam which has both a reverse phase and a reverse direction of propagation of a beam which is incident on the material. Hence, the device which produces this beam may be regarded as a type of 'mirror' with unusual image transforming properties. The system that gives rise to the conjugate wave is often termed a 'phase conjugate mirror'.

More specifically a phase conjugate mirror is a device for producing an output beam (referred to as a reflected beam or a phase conjugate beam emergent from a medium) which is the spatial phase conjugate of an input beam (referred to as the probe beam incident upon the medium). In mathematical terms, if the input beam is of the form $A \exp(-i(wt-kx))$, the output beam is of the form $A^* \exp(-i(wt+kx))$, where $A^*$ denotes the complex conjugate of the amplitude $A$. In physical terms, the phase conjugate beam is one which exactly retraces the path of the input (incident) beam, and at every point in space its phase is the complex conjugate of the phase of the incident beam. This process of generating the spatial phase conjugate of an input beam is referred to as "phase conjugation", or "phase conjugate reflection".

Phase conjugation can be achieved by a number of processes including three-wave mixing, four-wave mixing and stimulated scattering.

The process of phase conjugation by four-wave mixing involves the incidence of three input waves upon a non-linear medium. Two of these input waves (generally assigned as the first pump beam and the probe beam) are incident upon the medium (see FIG. 1). Another input beam (assigned as the second pump beam) is also incident upon the medium in the opposite direction with respect to the first pump beam, and may be perfectly counterpropagating with the first pump beam. At least two of these three incident beams must be coherent. This mixing configuration gives rise to a fourth beam (the phase conjugate beam) which is emergent from the medium and is the phase conjugate of the probe beam, as defined above. If, for instance, the two pump beams are not perfectly counterpropogating, the fourth beam is not a perfect phase conjugate of the probe beam. However, for the purposes of the present invention the fourth beam will be referred to as the "phase conjugate beam".

If all three input waves are of the same frequency, then the phase conjugate beam also has the same frequency. This process is termed "degenerate four-wave mixing".

Phase conjugate reflecting media can also be used in real time holography. Real time holography is the process where a transient hologram is formed in a nonlinear optical medium by the interaction of two or more coherent laser beams (writing beams). In general, the hologram is only present as long as the writing beams are present and for a subsequent period dictated by the relaxation mechanism of the medium. This real time hologram is read during the writing process (or shortly afterwards but before relaxation of the nonlinear medium has occurred) by a further beam. This reading beam may be at a different wavelength from the writing beams and need not be coherent with them. This reading process gives rise to yet another beam (the output beam) which carries information written by the writing beams and has the same frequency as the reading beam.

Optical phase conjugation by degenerate four-wave mixing has been demonstrated in various materials including semiconductors, atomic vapours, organic dye solutions and single crystals of inorganic photorefractive materials.

There is a continuing need for materials for the construction of phase conjugate mirrors which are both efficient and fast, for use in many applications including laser targetting (e.g. in laser fusion), high speed image processing, optical communication, elements in optical resonators and power and image transmission.

It has now been found that certain organic polymers can be used as a new and improved medium for phase conjugation.

Accordingly, the present invention is a phase conjugate mirror which comprises a nonlinear optical phase conjugating medium characterised in that the medium comprises a film of poly(acetylene).

According to another embodiment the phase conjugate mirror of the present invention is used for achieving phase conjugation by degenerate four-wave mixing in a region of the electromagnetic spectrum selected from ultra-violet, visible and infra-red.

According to yet another embodiment, the phase conjugate mirror of the present invention is used in a device for producing real time holograms by four wave mixing in a region of the electromagnetic spectrum selected from ultra-violet, visible, infra-red and combinations thereof.

The poly(acetylene) films that may be used as the phase conjugating media are suitably coherent films. The coherent films in turn may be isotropic, of low crystalline order or oriented. Methods of producing films of poly(acetylene) are claimed and described, e.g. in our published EP-A-0080329 and EP-A-0124979.

The phase conjugation is suitably carried out in a nanosecond regime although it will be possible to achieve the conjugation in both the picosecond and the microsecond regime.

The thickness of the poly(acetylene) films used will depend upon the type of poly(acetylene), upon the wavelength of the incident beams and upon the type of medium desired. Thus the thickness of a film of poly(acetylene) may vary from 0.01-200, suitably from 0.1-200 micrometers.

Within the range of thicknesses of films specified herein it will be appreciated that for beams in the visible region, the lower end of the ranges is preferred, whereas for beams in the infra-red region correspondingly, the upper end of the ranges is preferred.

Thus, for instance, for beams in the visible region the thickness of the film is suitably from 0.01-1 micron, preferably from 0.02-0.5 micrometers, typically 0.1-0.5 micrometers. Where beams in the infra-red region of the spectrum are used, the thickness of the film is suitably from 1 to 200 micrometers, preferably from 5 to 50 micrometers.

In the case of producing holograms using a poly(acetylene) film as the nonlinear medium, the device for producing real time holograms suitably has a means for producing at least two laser beams and one other beam which are incident upon the optical medium, giving rise to a further beam emergent from said medium. At least two (e.g. the first two) of the laser beams when incident upon the medium are capable of producing a hologram and at least one further beam (e.g. the third) when incident upon the medium is capable of reading the hologram formed by the first two incident beams. The third beam can itself be capable of forming a hologram. The emergent (reflected) beam from the medium is capable of carrying the hologram for subsequent transmission or projection. Thus the holograms formed can be transmitted e.g. to a detector, or projected e.g. onto a screen by conventional methods.

The use of poly(acetylene) films as phase conjugating media has the advantage that these materials can be fabricated in large areas, the process can be initiated on very fast time scales e.g. a subnanosecond timescale and phase conjugation can be achieved in the near infra-red region of the electromagnetic spectrum.

The present invention is further illustrated with reference to the following Examples.

EXAMPLE 1

Phase Conjugate Reflection

A film of oriented poly(acetylene) was prepared from a precursor polymer as claimed and described in our published EP-A-0080329. That is, a film of the precursor polymer was cast in a sample cell under an atmosphere of nitrogen. This was followed by transformation to poly(acetylene) under vacuum at 100° C. for 3 hours 20 minutes. The sample was then sealed using a glass cover slide bonded to the sample cell with a proprietary adhesive (Glass Bond).

Figure 2:
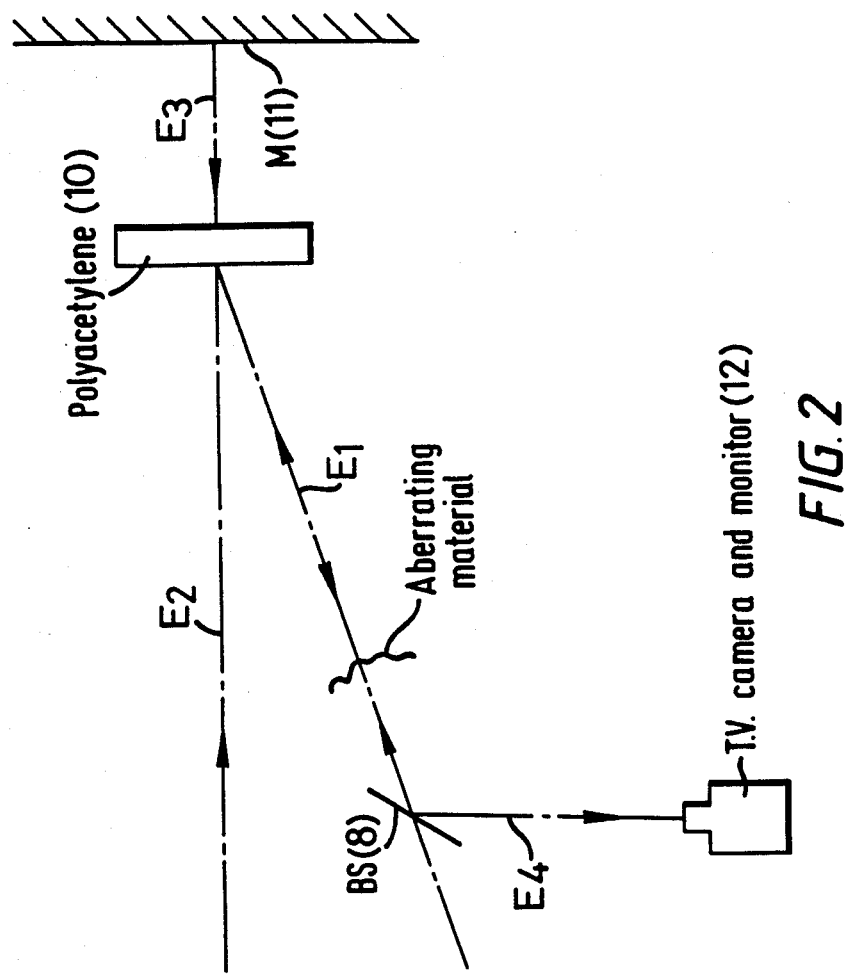

The experimental geometry for the observation of optical phase conjugation in poly(acetylene) is shown in FIG. 1. In FIG. 1 the numerical notations used represent the following:

1. Nd:YAG laser
2. half wave plate
3. 2m focal length convex lens
4. Mirror
5. Variable beam attenuator
6. Mirror
7. Beam splitter
8. Beam splitter
9. Delay line (comprising three prisms)
10. Polyacetylene film
11. Mirror
12. Storage oscilloscope detector (FIG. 1) or TV Camera and Monitor (FIG. 2)

A pulse laser beam was derived from a Nd:YAG (neodymium:yttrium-aluminium garnet) laser (1). The laser produced eight nanosecond pulses at a repetition rate of 1.7 Hz. The beam was incident on mirror (4) via a half-wave plate (2) and 2m focal length convex lens (3), where it was directed through the variable beam attenuator (5) to a mirror (6). The beam from (6) was directed to a beam splitter (7) where it was split into a diverted beam and an undiverted beam. The undiverted beam (the "forward pump beam") from splitter (7) was fed into a delay line (9) consisting of three right angled glass prisms. The diverted beam from splitter (7) was positioned to be incident on a further beam splitter (8) which reflected this beam (hereafter referred to as the "probe beam") back towards the poly(acetylene) film (10) forming the nonlinear optical medium. The delay line was used to ensure that the two forward going input beams (i.e. the forward pump beam and the probe beam), had equal optical path lengths and were hence coherent at the plane of the nonlinear optical medium which in this case was a poly(acetylene) film (10).

A counterpropagating or backward pump beam was derived from the forward pump beam by mirror (11) which was positioned so that the reflected beam from this mirror (11) was incident on the poly(acetylene) film (10) forming the nonlinear optical medium. Mirror (11) was adjusted so that the reflected beam therefrom was exactly counterpropagating with the forward pump beam.

The output beam of the system travelled along the path of the probe beam through beam splitter (8) where it was detected using a photodiode connected to a storage oscilloscope detector (12).

The intensity dependence of the phase conjugate beam was measured by varying the input intensity using the variable beam attenuator (5). The conjugate intensity was measured to be a nonlinear function of the input beam intensity as would be expected from a device of this type (i.e. a phase conjugate mirror).

EXAMPLE 2

Aberration Correction

Most applications of optical phase conjugation involve the ability of the conjugate wave to compensate (or correct) for phase aberration. The optical configuration to demonstrate this effect using isotropic poly(acetylene) as the nonlinear material is shown in FIG. 2.

The poly(acetylene) sample was prepared by the method described in Example 1.

The probe beam ($E_1$) passed through a phase aberrator (a piece of distorted glass) and was imaged onto the poly(acetylene) film (10) which was the nonlinear medium. The conjugate beam ($E_4$) was then passed back through the aberrator and its intensity profile was recorded using a TV camera and a monitor (12).

The results of this experiment are shown in FIG. 3.

Figure 3A:
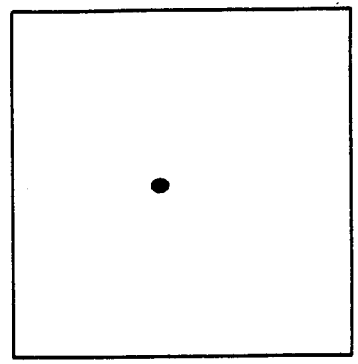
Figure 3B:
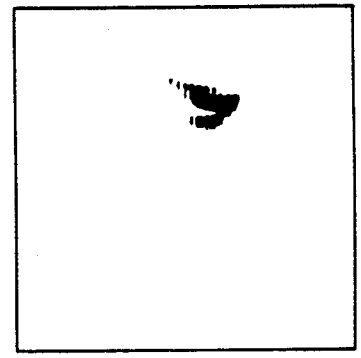
Figure 3C:
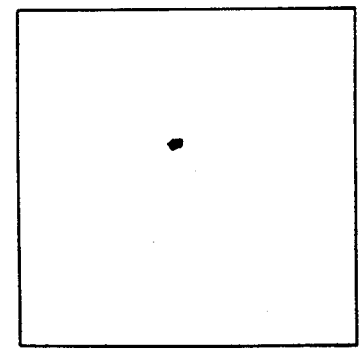

FIG. 3a shows the unaberrated laser spot. The aberrated probe beam (after passage through the aberrator) is shown in FIG. 3b. Finally FIG. 3c shows a photograph of the conjugate wave after passage back through the aberrator.

EXAMPLE 3

Phase Conjugate Reflection in Isotropic Polyacetylene at 1064 nm

Measurement of the Phase Conjugate Reflectivity (Rpc) of polyacetylene at 1064 nm was carried out as described in Example 1 with respect to FIGS. 1 and 2. The phase conjugate reflectivity (Rpc) with respect to the description in Example 1 is defined as the ratio of the phase conjugate beam intensity ($I_4$) to the probe beam intensity ($I_1$) i.e.

$$Rpc = \frac{I_4}{I_1}$$

By adjusting the polarisation conditions of the three input beams a unique determination of the contribution of the grating formed by each pair of beams can be obtained.

The following sets of conditions were analysed.
(3.1) Forward pump beam (a) and probe beam (b) form a spatial grating, backward pump (c) and probe beam (b) form a spatial grating, and forward pump beam (a) and backward pump beam (c) form a temporal grating.

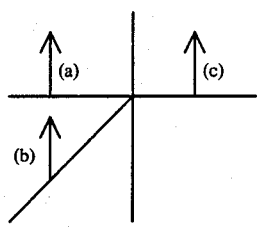

(3.2) Forward pump (a) and probe beam (b) form a spatial grating.

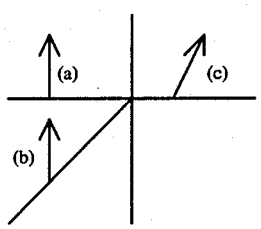

(3.3) Counterpropagating forward pump beam (a) and backward pump beam (b) are coherent and form a temporal grating.

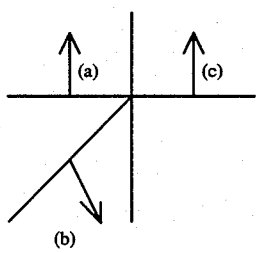

In the description below, in the so-called 'fast' component, the phase conjugate reflectivity (Rpc) is a measure of the efficiency of a temporal grating formed between the forward and backward pump beams.

Similarly, in the so-called 'slow' component, the phase conjugate reflectivity (Rpc) is a measure of the efficiency of the the spatial grating formed between the forward pump beam and the probe beam. In the so-called 'all gratings contributing' component, the phase conjugate reflectivity (Rpc) is a measure of the efficiency of the contributions from all the possible permutations of spatial and temporal gratings from a given set of forward pump, backward pump and probe beams.

The intensities of the three input beams were varied using a variable beam attenuator. The intensities of the phase conjugate beam, the probe beam and one forward pump beam were measured using a silicon photodiode. The results are tabulated in Table 1.

TABLE 1

| Forward Pump Beam Intensity ($I_2$) $W/cm^2 \times 10^5$ | Probe Beam Intensity ($I_1$) $W/cm^2 \times 10^5$ | Phase Conjugate Intensity ($I_4$) $(W/cm^2) \times 10^5$ | Rpc (%) |
|---|---|---|---|
| 1036 | 79 | 0.70 | 0.88 |
| 1006 | 74 | 0.54 | 0.73 |
| 888 | 66 | 0.37 | 0.56 |
| 814 | 63 | 0.20 | 0.55 |
| 740 | 57 | 0.15 | 0.26 |

TABLE 1-continued

| Forward Pump Beam Intensity ($I_2$) $W/cm^2 \times 10^5$ | Probe Beam Intensity ($I_1$) $W/cm^2 \times 10^5$ | Phase Conjugate Intensity ($I_4$) $(W/cm^2) \times 10^5$ | Rpc (%) |
|---|---|---|---|
| 666 | 49 | 0.10 | 0.20 |

The polarisation conditions of the incident beams determine the type of induced grating observed. Only beams with parallel polarisation can interfere and therefore form a grating. If only the polarisations of the two counter propagating pump beams are parallel, a type of polarisation grating is formed in the material. This grating is spatially fluctuating at a frequency twice that of the incident field. For this reason only very fast (i.e. Kerr like) interactions will be able to respond to this phenomenon and a material that can produce a conjugate signal from this interaction is a very high speed material.

The results of this experiment are shown in Table 2.

TABLE 2

Forward Pump Beam Intensity = $814 \times 10^5$ W/cm$^2$
Probe Beam Intensity = $63 \times 10^5$ W/cm$^2$

| Polarisation Conditions | | | Phase Conjugate Reflectivity (%) |
|---|---|---|---|
| Forward Pump | Backward Pump | Probe Beam | |
| ↑ | ↑ | ↑ | 0.55 |
| ↑ | → | ↑ | 0.35 |
| ↑ | ↑ | → | 0.15 |

EXAMPLE 4

4.1 Phase Conjugation in Isotropic Polyacetylene at 532 nm

The experiments performed as described in Example 1 with respect to FIG. 1 at 1064 nm were repeated using light having a wave-length of 532 nm produced by inserting a frequency doubling crystal in the Nd:YAG laser.

Samples of polyacetylene were prepared by spinning a dilute solution of precursor onto a glass disc. The samples were then sealed using a glass cover slip bonded to the glass disc with glass bond.

| Sample preparation details:- | | |
|---|---|---|
| Precursor dilution Poly(acetylene) | Spinning Conditions | Sample Thickness |
| 1:20 | 2000 rpm for 60 seconds | ca 1000 Å |

The results of phase conjugation at 532 nm (using definitions as in Example 3 above) are shown in Tables 3, 4 and 5 below:

TABLE 3

| All Gratings Contributing (3.1) | | | |
|---|---|---|---|
| $I_4$ $(W/cm^2) \times 10^2$ | $I_1$ $(W/cm^2) \times 10^5$ | $I_2$ $(W/cm^2) \times 10^5$ | Rpc (%) |
| 12.9 | 2.44 | 45.38 | 0.53 |

TABLE 4

| | 'Slow' Component (3.2) | | |
|---|---|---|---|
| $I_4$ (W/cm$^2$) × 10$^2$ | $I_1$ (W/cm$^2$) × 10$^5$ | $I_2$ (W/cm$^2$) × 10$^5$ | Rpc (%) |
| 2.43 | 2.44 | 45.38 | 0.11 ± 0.02 |
| 0.56 | 1.37 | 25.50 | 0.04 ± 0.007 |
| 0.14 | 0.77 | 14.40 | 0.02 ± 0.008 |

TABLE 5

| | 'Fast' Component (3.3) | | |
|---|---|---|---|
| $I_4$ (W/cm$^2$) × 10$^2$ | $I_1$ (W/cm$^2$) × 10$^5$ | $I_2$ (W/cm$^2$) × 10$^5$ | Rpc (%) |
| 0.53 | 2.44 | 45.38 | 0.02 |

4.2 The above experiment 4.1 was successfully repeated and phase conjugation achieved using a film of oriented poly(acetylene) instead of isotropic poly(acetylene).

EXAMPLE 5—Wavelength dependence of phase conjugation in Isotropic polyacetylene (574–608 nm)

Experiments over the wavelength region 574–604 nm were performed by replacing the Nd:YAG laser shown in FIG. 1 with an Excimer pumped dye laser system. A Lambda-Physik Excimer Laser (EGM201-204 MSC) lasing at 308 nm was used to pump a Lambda Physik FL 3002 dye laser. The dye used for this experiment was Rhodamine 6G which gave a tunable output in the range 574–608 nm. The phase conjugate reflectivity was measured as a function of wavelength. The results are tabulated in Table 6.

TABLE 6

| | Results | |
|---|---|---|
| Wavelength (nm) | Phase Conjugate Reflectivity (Rpc %) | $I_2$ (W/cm$^2$) × 10$^3$ |
| 574 | 0.03–0.04 | 3268 |
| 579 | 0.03–0.05 | 4412 |
| 584 | 0.03–0.05 | 4706 |
| 589 | 0.08–0.12 | 4150 |
| 594 | 0.08–0.15 | 3268 |
| 599 | 0.08–0.14 | 2288 |
| 604 | 0.03–0.04 | 1177 |

We claim:

1. A phase conjugate mirror which comprises a non-linear optical phase conjugating medium characterised in that the medium comprises a film of poly(acetylene).

2. A phase conjugate mirror according to claim 1 wherein the poly(acetylene) film used is a coherent film.

3. A phase conjugate mirror or a device according to claim 1 or 2 wherein the thickness of the poly(acetylene) film is from 0.01–200 micrometers.

4. A phase conjugate mirror according to claim 3 wherein the thickness of the poly(acetylene) film is from 0.01–1 micrometer when used in conjunction with beams having a wavelength in the visible region of the electromagnetic spectrum.

5. A phase conjugate mirror according to claim 3, wherein the thickness of the poly(acetylene) film is from 1 to 200 micrometers when used in conjunction with beams having a wavelength in the infra-red region of the electromagnetic spectrum.

6. A phase conjugate mirror according to claim 1 when used for achieving phase conjugation by degenerate four-wave mixing in a region of the electromagnetic spectrum selected from ultra-violet, visible and infra-red.

7. A phase conjugate mirror according to claim 1 when used in a device for producing real time holograms by four-wave mixing in a region of the electromagnetic spectrum selected from ultra-violet, visible, infra-red and combinations thereof.

8. A phase conjugate mirror when used in a device according to claim 7 wherein said device has means for producing at least two laser beams and one other beam which are incident upon the optical medium, thereby giving rise to a further beam emergent from said medium.

9. A phase conjugate mirror when used in a device according to claim 8 wherein at least two (i.e. first two) of the laser beams when incident upon the optical medium are capable of producing a hologram and at least one further beam (third) when incident upon the medium is capable of reading the hologram formed by the first two incident beams.

10. A phase conjugate mirror when used in a device according to claim 9 wherein the third beam is itself capable of forming a hologram.

* * * * *